United States Patent
Brennan et al.

(10) Patent No.: US 6,667,368 B1
(45) Date of Patent: Dec. 23, 2003

(54) AMINO ACID FUNCTIONALIZED POLYMERS FOR GRAFT COPOLYMERIZATIONS

(75) Inventors: Anthony B. Brennan, Gainesville, FL (US); Michael P. Zamora, Baton Rouge, LA (US); Christopher Batich, Gainesville, FL (US); Kenneth B. Wagener, Gainesville, FL (US)

(73) Assignee: University of Florida Research Foundation, Gainsville, FL (US)

( * ) Notice: Subject to any disclaimer, the term of this patent is extended or adjusted under 35 U.S.C. 154(b) by 0 days.

(21) Appl. No.: 09/529,926

(22) PCT Filed: Oct. 23, 1998

(86) PCT No.: PCT/US98/22367

§ 371 (c)(1),
(2), (4) Date: Jul. 6, 2000

(87) PCT Pub. No.: WO99/20669

PCT Pub. Date: Apr. 29, 1999

Related U.S. Application Data (60) Provisional application No. 60/062,699, filed on Oct. 23, 1997.

(51) Int. Cl.[7] .............................................. C08L 79/00
(52) U.S. Cl. ......................... 525/66; 525/69; 525/148; 525/425; 526/318.4; 526/320; 526/321; 526/327; 526/329; 526/340.2

(58) Field of Search .............................. 526/318.4, 320, 526/321, 327, 329, 340.2, 346; 525/66, 148, 69, 425

(56) References Cited

U.S. PATENT DOCUMENTS

| 5,219,934 A | | 6/1993 | Heger et al. ................... 525/66 |
| 5,412,051 A | * | 5/1995 | McCallum et al. .......... 526/220 |
| 6,197,522 B1 | * | 3/2001 | Keller et al. .................. 435/7.1 |
| 6,218,491 B1 | * | 4/2001 | Fu et al. ....................... 526/271 |
| 6,280,713 B1 | * | 8/2001 | Tranchant et al. ........... 424/401 |

OTHER PUBLICATIONS

Yamashita et al Polymer Bulletin, V.5, No. 7, Sep. 1981, pp. 361–6 "Synthesis of polyamide–poly(methyl methacrylate)Graft Copolymers by Polycondensation Reactions of Macromonomers".*

Chujo et al Journal of Polymer Science: Part A: Polymer Chemistry, vol. 27, 1989, pp 2007–14 "Synthesis of Aromatic Dicarboxyl–terminated Poly(methyl Methacrylate) Macromonomers".*

* cited by examiner

Primary Examiner—Tatyana Zalukaeva
(74) Attorney, Agent, or Firm—Akerman Senterfitt (57) ABSTRACT

Amino acid functionalized polymers useful for graft copolymerization prepared by reacting a mixture containing, for chain transfer, a thio-substituted amino acid and an ethylenically unsaturated monomer.

8 Claims, 5 Drawing Sheets

| POLYAMID PRECURSORS | MACROMONOMER | | SAMPLE ID |
|---|---|---|---|
| | (TYPE) | (WEIGHT %) | |
| | — | 0 | PABA |
| | p(BA) 2.6kg/mole | 33 | 66PABA-g-33BA |
| | p(BA) 2.6kg/mole | 66 | 33PABA-g-66BA |
| | — | 0 | PhDAA |
| | p(BA) 2.6kg/mole | 66 | 33PhDAA-g-66BA |
| | p(BA) 2.6kg/mole | 90 | 10PhDAA-g-90BA |
| | p(MMA-co-OFPMA) 19.9kg/mole | 66 | 33PhDAA-g-66FA |
| | p(BA)-NONFUNCTIONALIZED 3.2kg/mole | 66 | 33PhDAA-g-66UBA |

AMINO ACID FUNCTIONALIZED POLYMERS FOR GRAFT COPOLYMERIZATIONS

This application is a 371 of PCT/US98/22367, Oct. 23, 1998, which claims benefit of provisional application No. 60/062,699 filed Oct. 23, 1997.

Research leading to the conception and reduction to practice of the invention was supported in part by Grant No. DE 09307-08 issued by the National Institutes of Health (NIH). The United States Government has certain rights in and to the claimed invention.

BACKGROUND OF THE INVENTION

1. Field of the Invention

The present invention relates to novel amino acid functionalized macromonomers or polymer precursors, methods for their preparation and novel methods for preparing novel graft copolymers therewith.

2. Description of the Prior Art

It is often desirable to combine two or more polymer systems to obtain a product which exhibits the properties of each system. Most polymers, however, are mutually incompatible in that they cannot be intimately admixed or blended to produce a product having a homogeneous composition.

One solution is to graft copolymerize two or more polymer systems such that the product contains segments of each component homogeneously distributed throughout the copolymer, each contributing its desirable properties thereto.

Although physical blends or mixtures of, e.g., polymers A and B may be incompatible, a graft copolymer of A with another polymer (C) compatible with polymer (B) will enable the production of a homogenous blend of A/C and B. Graft copolymers with segments of dissimilar chemistries have been shown to be useful in a variety of applications as surfactants, compatibilizers, impact modifiers and surface modifiers.

Although it is possible to graft a polymer onto a previously polymerized backbone, these procedures are typically "messy", often requiring radiation or an energy source to promote grafting. It is usually very difficult to ensure the production of a homogeneous graft copolymer since this type of grafting usually results in a cross-linked base material, as well as a cross-linked layer of grafted polymer.

Most conventional routes to graft copolymers involve employing an intermediate "macromonomer" which is a polymer/oligomer with a functional group capable of undergoing further chemical reaction polymerization. Macromonomers are most often obtained by anionic polymerization. The conditions attendant anionic polymerization, however, severely limit the number and nature of monomers which can be polymerized thereby. Moreover, a majority of the studies thus far have focussed on the synthesis of macromonomers capable of reacting with vinyl monomers to form graft copolymers.

There are few reports of well defined polyamide graft copolymers with addition polymers such as poly(acrylates) or poly(methacrylates). Most attempts of amide graft copolymerizations with addition polymers involve either the in situ formation of graft copolymers in polymer blends or radiation induced surface graft techniques. Although effective for their intended applications, neither method produces a well defined graft copolymer.

It is an object of the present invention to utilize novel free-radical chain transfer methods to create novel macromonomers which are capable of undergoing novel condensation polymerization reactions with polymers to prepare novel graft copolymers.

Another object of the invention is to provide condensation polymerizable macromonomers, more specifically, amino acid terminated macromonomers, and a novel route to the synthesis of polyamide graft copolymers.

SUMMARY OF THE INVENTION

The above and other objects are realized by the present invention, one embodiment of which relates to a method of preparing an amino acid functionalized macromonomer composition having a degree of polymerization of from about 5 to about 20,000 comprising reacting by free radical polymerization a mixture comprising:

(a) for chain transfer an amino acid having the formula:

wherein:
$R_1$ and $R_2$ are H or lower alkyl, e.g., $CH_3$; and
Z is alkylene, e.g., ethylene, propylene, butylene and the like; arylene, e.g., phenyl, biphenyl; and (b) at least one polymerizable ethylenically unsaturated monomer, e.g., acrylates, e.g., alkyl acrylate, phenyl acrylate, cycloaliphatic acrylate; methacrylates, e.g., alkyl methacrylate, phenyl methacrylate, cycloaliphatic methacrylate; fluoro-substituted acrylates, e.g., octafluoropentyl methacrylate; fluoro-substituted alkenes such as ethene, propene, butene, butadiene, hexene and octene, such that, as a result of reacting said mixture, at least 10 mol percent of the macromonomer composition product has the end group:

A further embodiment of the invention comprises a macromonomer prepared according to the above-described method.

Another embodiment of the invention is an amino acid functionalized addition-polymerized macromonomer composition having a degree of polymerization of from about 5.0 to about 20,000.

An additional embodiment of the invention relates to a method of preparing a graft copolymer of a polyamide comprising reacting under condensation polymerization conditions a mixture comprising:

(a) a macromonomer described above, and
(b) a monomeric mixture which forms a polyamide by condensation polymerization.

Other embodiments of the invention comprise a graft copolymer prepared by the above-described method, as well as graft copolymers of a polyamide and the above-described macromonomer composition.

DETAILED DESCRIPTION OF THE INVENTION

The present invention is predicated on the utilization of mercaptans or —SH substituted compounds as chain transfer, molecular weight reducing agents to prepare macromonomers suitable for graft copolymerization with a wide variety of polymers via condensation polymerization routes. The chain transfer mechanism is set forth in FIG. 1. If the mercaptan is functionalized, the resulting polymer is similarly functionalized as depicted in reactions 5 and 6 of FIG. 1.

It is preferred to employ thiol- or mercaptan-terminated amino acids as chain transfer agents. An amino acid functionality is preferred over other end groups such as diacids or diamines due to the inherent stoichiometry that it provides. This stoichiometry is required in the condensation graft reaction to ensure the highest degree of polymerization possible.

Generally, the method of the invention involves the free radical polymerization of ethylenically unsaturated monomers in the presence of the functional chain transfer agent. Mercaptans, compounds containing a sulfur-hydrogen bond, are commonly used in chain transfer reactions. In fact, mercaptans are commonly used to control molecular weight in commercial polymerization reactors [Ito, *Macromolecules*, Vol. 10, page 821 (1977); Rosen, *Fundamental Principles of Polymeric Materials*, pages 103–128, Wiley & Sons, N.Y. (1982)]. Cysteine, a naturally occurring amino acid, contains the sulfhydryl group required for mercaptan chain transfer reactions. The addition of cysteine, an effective chain transfer agent, results in amino acid functionality.

It will be understood, however, by those skilled in the art that any thiol- or mercapto-substituted amino acid capable of functioning as a chain transfer agent may be employed in the practice of the invention.

Exemplary of such amino acids are those embraced by the above structural formula, e.g., cysteine.

The macromonomers may be derived from any suitable addition-polymerizable ethylenically unsaturated monomer such as, e.g., methyl acrylate, methyl methacrylate, tert-butylacrylate, cyclohexyl acrylate, cyclohexyl methacrylate, butyl acrylate, butyl methacrylate, phenyl acrylate and phenyl methacrylate.

The reaction of macromonomer formation can be modeled by the Mayo Equation:

$$\frac{1}{DP_n} = \frac{1}{DP_{no}} + C_S \frac{[S]}{[M]} \quad [2.1]$$

wherein:

$C_s$=chain transfer constant
[S]=chain transfer agent concentration
[M]=monomer concentration
$DP_n$=degree of polymerization
$DP_{no}$=degree of polymerization without chain transfer agent.

The equation enables a determination of the efficiency of the chain transfer for functionalizing growing polymer chains.

The degree of polymerization in the absence of chain transfer to transfer agent, $DP_{no}$, can be described by equation 2.2:

$$\frac{1}{DP_{no}} = \frac{k_1}{k_p^2} \frac{R_p}{[M]^2} \quad [2.2]$$

Substituting this value in equation 2.1 gives the Mayo equation (2.3) for prediction of the chain transfer constant:

$$\frac{1}{DP_n} = \frac{1}{DP_{no}} + C_S \frac{[S]}{[M]} \quad [2.3]$$

This equation is valid only when the initiator concentration is low. By synthesizing a series of polymers with different ratios of chain transfer agent to monomer, a Mayo plot can be used to determine the $C_s$. Knowledge of the $C_s$ for a particular system enables one to adjust the reactant concentrations in order to target a specific molar mass polymer.

The Mayo model can also be used to predict the functionality of the polymer obtained. If both sides of equation 2.3 are multiplied by $DP_n$:

$$1 = \frac{\overline{DP_n}}{\overline{DP_{no}}} + DP_n C_S \frac{[S]}{[M]}$$

where the two terms on the right represent the fraction of unfunctionalized chains. If the value of $C_s$ and, therefore, the rate of chain transfer is high, termination occurs primarily by chain transfer and high rates of functionalization are expected. The extent of functionalization also increases with increasing mercaptan content. If a lower concentration of chain transfer agent is used or if a lower value of $C_s$ is observed, the probability of termination through other methods such as disproportionation or combination increases. As other termination mechanisms become more prevalent, the extent of functionalization decreases.

It is important to note the limitations of the Mayo model. This model is valid only under certain assumptions, one of which is that chain transfer occurs exclusively to the chain transfer agent. In practice, however, some chain transfer to solvent and initiator is generally observed. Also, these values, as in the case of copolymer reactivity ratios, are valid at instantaneous conditions. In other words, low conversions are desired in order to limit the composition drift between the monomer and chain transfer agent. With these assumptions in mind, determined values of $C_s$ and predicted functionalities are only estimates or theoretical predictions assuming ideal conditions. However, the model is valuable for making fairly accurate estimates provided these limitations are taken into account.

Most macromonomers synthesized to date using chain transfer involve the preparation of vinyl terminated polymer chains. These free radically polymerized macromonomers can be reacted with vinyl monomers to form graft copolymers. The technique has thus been largely limited to addition-addition type chemistries. The present invention enables an expansion of this technique to addition-condensation combinations utilizing, e.g., polyamides and the condensation polymerizable backbone. Thus, polyamides could be surface modified or rubber-toughened by graft copolymerization with a suitably functionalized macromonomer.

Figure 3:
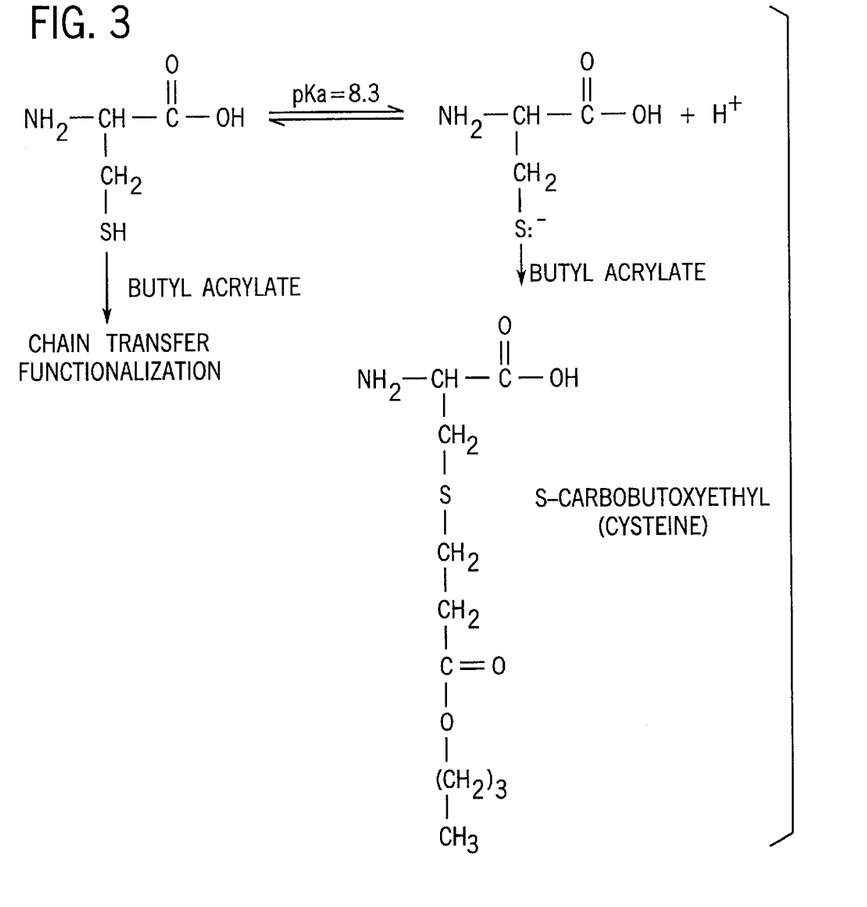

Initial attempts did not yield highly functionalized free radical polymerized chains. The molecular weight of the product was thus much higher than would be expected of a suitable macromonomer. It was suspected that a side reaction may inhibit complete chain transfer. Further investigation revealed that the reaction depicted in FIG. 3 was competing with the chain transfer mechanism. Cysteine is ionizable to the sulfur anion, the equilibrium reaction having a pKa of 8.3. The anionic form reacts with, e.g., acrylates, to form the by-product S-carbobutoxyethyl cysteine. This side reaction reduces the concentration of cysteine, resulting in an incomplete chain transfer.

By reducing the pH of the reaction to a value below the pKa of the chain transfer (i.e., about 8.3), the side reaction is substantially eliminated, thus greatly improving chain transfer. The pH should, therefore, be adjusted to a value greater than 0.0 and below about 8.0, preferably to a value between about 0.5 and about 3.5.

Figure 1:
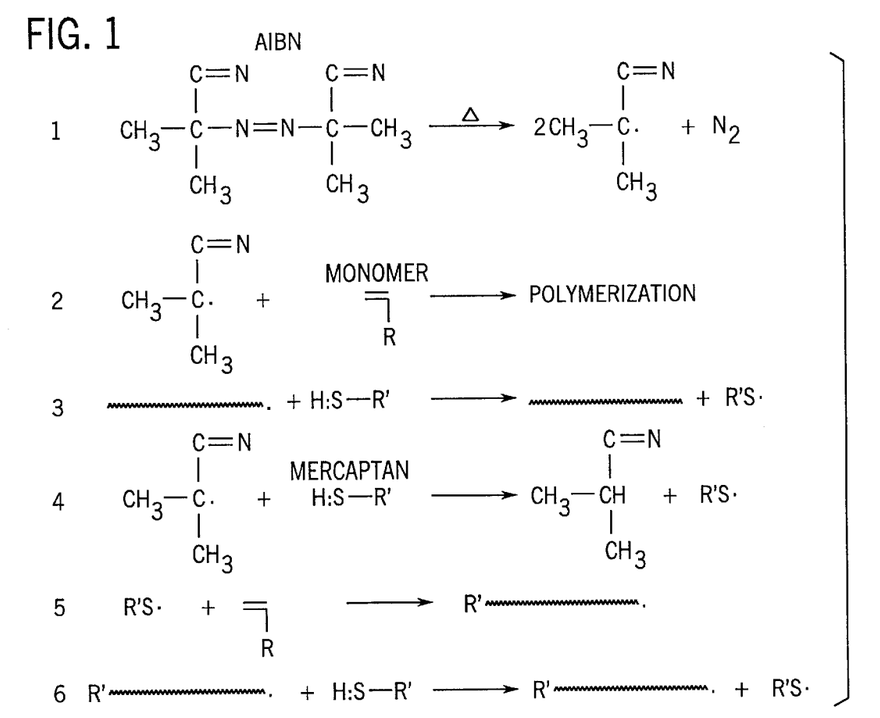
FIGS. 1–3, 5 and 7 are schematic representations of reaction schemes of various of the methods of the invention.

The mechanism by which functionalization can occur is depicted in FIG. 1. Steps 1 and 2 are typical processes of free radical initiation. When exposed to heat, the azobisisobutyronitrile (AIBN) breaks down into free radicals and nitrogen gas is evolved. The AIBN radicals can thus initiate the polymerization of vinyl compounds. If there is no chain transfer agent present, the polymerization continues until termination by disproportionation or combination occurs. In the presence of a mercaptan, termination can occur through chain transfer.

The hydrogen from the sulfhydryl group of the mercaptan is readily extractable. A propagating polymer chain can thus react with the mercaptan (Step 3), terminating propagation and leaving a sulfur radical on the mercaptan. If the concentration of mercaptan is high, the mercaptan itself can react with the AIBN radical (Step 4), also giving a sulfur radical. The resulting sulfur radical can then initiate the free radical polymerization of a vinyl monomer (Step 5).

If the mercaptan contains hydroxyl or carboxylic acid functional groups (R'), the initiating sulfur radical introduces functionality to one end of the macromolecule. The growing functionalized polymer radical can again react with the mercaptan (Step 6), yielding a terminated functionalized chain and another molecule of sulfur radical which can react with more monomer (Step 5) to form a reaction loop. The effectiveness of functionalization is dependent on the chain transfer constant of the mercaptan, as well as the relative concentrations of mercaptan, monomer and free radical initiator. The AIBN concentration is kept extremely low relative to the chain transfer agent to minimize the number of chains initiated by the AIBN. Any chains initiated by AIBN will be non-functionalized (see Steps 2 and 3).

The advantage of this chain transfer method is that it can be used with a wide variety of vinyl monomer systems. Macromonomers composed of any monomer which can be polymerized free radically should be able to be synthesized using this method. Also, macromonomers which themselves are random copolymers also become feasible.

The invention will be illustrated utilizing the amino acid cysteine; however, it will be understood by those skilled in the art that any amino acid having the formula set forth above may be utilized, e.g., those wherein Z is an alkylene group having up to as many as 1,000 carbon atoms or arylene, including those interrupted by an O atom, i.e., ether groups. It is usually necessary that the thiol group and the amino group occupy carbon atoms separated from each other by at least one carbon atom; i.e., that the thiol group occupy a carbon atom at least $\beta$ to the carbon atom occupied by the amino group.

Figure 2:
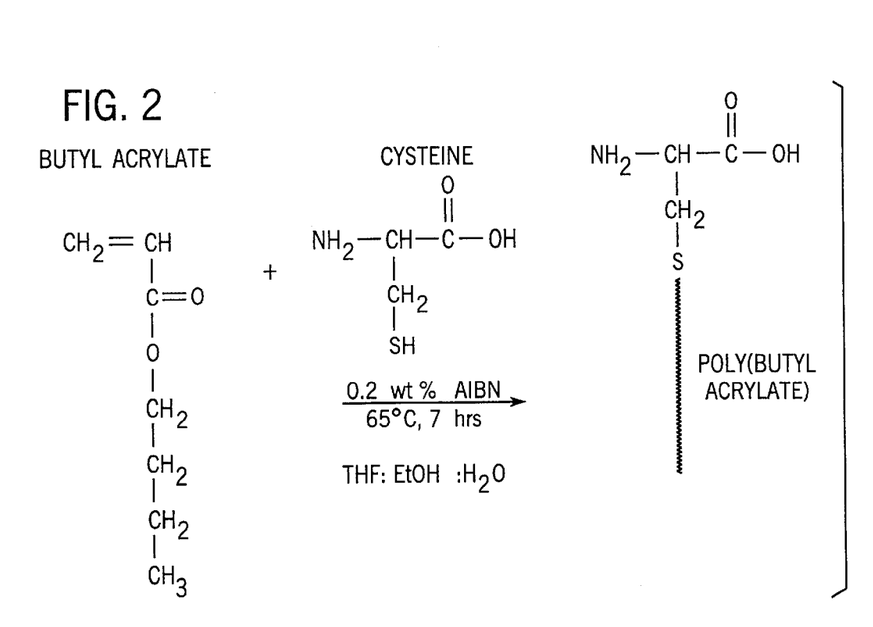

FIG. 2 sets forth a reaction scheme for the amino acid functionalization of butyl acrylate to form an amino acid terminated poly(butyl acrylate). Cysteine is a naturally occurring amino acid containing a reactive SH group. The mechanism depicted in FIG. 2 can be utilized to free radically polymerize a wide variety of monomers, both hydrophobic and hydrophilic. Suitable such monomers include, e.g., butyl acrylate, methyl acrylate, methyl methacrylate, tert-butyl acrylate, cyclohexyl acrylate, cyclohexyl methacrylate, butyl methacrylate, phenyl acrylate, phenyl methacrylate and the like. Those skilled in the art will realize that any free radically polymerizable monomer may be polymerized according to the method of the invention to produce a functionalized macro-monomer.

As noted above, macromonomers and graft copolymers described heretofore have been mostly limited to addition-addition copolymers. There are only a few cases in which addition-type macromonomers have been graft copolymerized with condensation-type monomers [Yamashita et al, *Polym. Bull.*, Vol. 5, page 361 (1981); Chujo et al, *Polym. Bull.*, Vol. 8, page 239 (1982); Chujo et al, *Polym. Comm.*, Vol. 25, page 278 (1984); Chujo et al *J. Polym. Sci.*, Polym. Chem. ed., Vol. 26, page 2991 (1988)]. In order for the macromonomers to be capable of undergoing condensation reactions in the production of graft copolymers, they must be difunctional. This does not mean that each end of the polymer must be functionalized; it is only necessary and preferred that one end of the copolymer contain a difunctional reactive group.

Only two authors have reported the synthesis of difunctional macromonomers using chain transfer agents. In *Euro. Polym. J.*, Vol. 28, page 1527 (1992), Nair demonstrated the free radical chain transfer polymerization of styrene and various acrylates in the presence of mercaptosuccinic acid. Dicarboxylic acid terminated polymers were synthesized in a range of molecular weights from 1 to 10 kg/mol and were shown to be highly functionalized.

Yamashita et al, supra, and Chujo et al, supra, carried out brief studies on the preparation of dicarboxylic acid, as well as dihydroxyl functional macromonomers of various methacrylate monomers. They also employed mercaptosuccinic acid, as well as thioglycerol in the macromonomer preparation.

By applying the Mayo equation to a series of polymerizations with varying chain transfer agent concentrations (see FIG. 4), the chain transfer constant can be determined. The chain transfer constant for cysteine in the system of the invention is about 1.49 which is as high or higher than most of the mercaptans used in the synthesis of vinyl functionalized macromonomers.

Inductively coupled plasma was employed to determine the sulfur concentration and, therefore, the percent functionalization of the macromonomer described above. The results in Table 1 show that increasing the concentration chain transfer agent results in increased functionality.

TABLE 1

Functionalization of Butyl Acrylate Oligomers With Cysteine

| [S/M] × $10^2$ | Mn (Kg/mol) | % Functionalization (ICP-S concentration) |
| --- | --- | --- |
| 0 | 63 | 0 |
| 1.6 | 5.9 | 72 |
| 3.2 | 2.6 | 75 |
| 6.4 | 1.2 | 84 |

[S/M] = relative molar concentration of cysteine to butyl acrylate

The functionalized macromonomers of the invention may be employed in the novel method of the invention to form graft copolymers with a wide variety of polymers such as, e.g., polyamides, i.e., nylons such as nylon 6, nylon 6,6, nylon 6,10, nylon 10 and nylon 12.

Generally, the graft copolymer is prepared by reacting under condensation polymerization conditions a mixture comprising:

(a) for chain transfer, a macromonomer of claim 5 or 6, and
(b) a monomeric mixture which forms a polyamide by condensation polymerization. More specifically, the monomeric mixture comprises:
  (i) a mixture of a dicarboxylic acid having 1 to 10 carbon atoms and terminal carboxyl groups and a diamine having 1 to 12 carbon atoms and primary amino groups, salts, esters, amides and acid halides of the dicarboxylic acid and salts of the diamine;
  (ii) amino monocarboxylic acids having 1 to 10 carbon atoms and primary amino groups and terminal carboxyl groups, and
  (iii) lactams, esters and amides of the amino carboxylic acids or mixtures of any of the above.

Specific examples include p-aminobenzoic acid and a mixture of 1,6-phenylene diamine and adipic acid.

Figure 5:
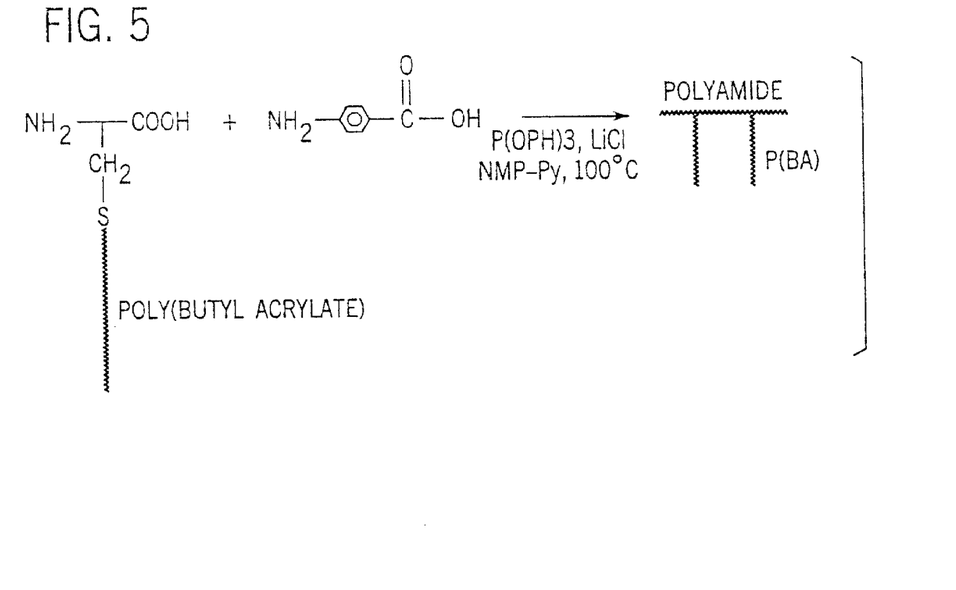

A reaction scheme for graft copolymerizing cysteine functionalized poly(butyl acrylate) and p-aminobenzoic acid to form a polyamide is depicted in FIG. 5. The transmission FTIR (FIG. 6) of the resulting product shows that a poly (butyl acrylate)-polyamide graft copolymer is synthesized by this method.

The methods of the invention may be employed to design a variety of condensation graft copolymers not heretofore available having properties not previously possessed by such systems. For example, the use of low surface energy fluorinated macromonomers will enable the production of polyamides having modified surface properties, i.e., lower the moisture adsorption capability thereof. Employing rubbery macromonomers will result in impact toughened polyamides.

It will be understood by those skilled in the art having been exposed to the description herein of the method of the invention that the latter is applicable to the formation of any functionalized macromonomer capable of entering into a condensation-type graft copolymerization reaction.

The invention is illustrated by the following non-limiting examples:

EXAMPLE 1

This example depicts the preparation of specific macromonomers utilizing cysteine as the chain transfer agent and butyl acrylate, methyl methacrylate and octafluoropentyl methacrylate as monomers. Azobisisobutyronitrile (AIBN) was used as the initiator.

Poly(butyl acrylate) was chosen because it has a very low glass transition temperature (−54° C.) and, therefore, any graft copolymers containing it may be used as rubber modifiers. The fluoroacrylate copolymer was chosen because, due to the low surface energy of fluoropolymers in general, graft copolymers could be utilized as surface modifiers.

Synthetic Procedure

Monomer concentrations in the polymerizations were maintained constant at 16 wt. %. AIBN concentrations also remained constant at 0.1 mol % of the monomer concentration. Cysteine levels were varied in order to determine their effect on the polymerization of acrylates and methacrylates.

In a typical polymerization, cysteine was dissolved in the prescribed amount of 10 N HCl in a 200 ml roundbottom flask equipped with a magnetic stirrer. Water and tetrahydrofuran (THF) were then added in concentrations yielding a 50 g solution of 96.5/3/0.5 ratio, by weight, THF/water/HCl. Ten grams of monomer were added and the desired AIBN concentration was then dissolved in the reaction mixture. A reflux condenser was attached to the flask. The reaction set-up was then placed in a glycerin bath at 65° C. and run for 6 hours under constant stirring. The isolation and purification of the various macromonomers synthesized are described below.

A common solvent for both the monomer, either butyl acrylate or the fluoroacrylate-MMA mixture, and the cysteine chain transfer agent must be identified in order to ensure a homogeneous solution during polymerization. Cysteine is a crystalline powder insoluble in common organic solvents. Solubility tests in the approximate concentrations required for synthesis of a 3 kg/mol macromonomer were performed. As shown in Table 2, at the appropriate concentrations, cysteine is insoluble in some common organic solvents which are suitable for the polymerization of butyl acrylate. Furthermore, butyl acrylate is completely immiscible with water, quickly separating into two layers.

TABLE 2

Solvent Determination for Monomer and Chain Transfer Agent

| | Toluene | THF | DMF | Ethanol | n-Butanol | $H_2O$ |
|---|---|---|---|---|---|---|
| Cysteine | i | i | i | i | i | s |
| Butyl acrylate | s | s | s | s | s | i |

Concentration of cysteine = 0.03 g/5 g solvent.
Concentration of monomer = 1 g/5 g solvent.
i = insoluble; s = soluble.

Because of the strong H-bonding interactions within the amino acid, it appeared necessary to add $H_2O$ to disrupt crystalline structure. Cysteine was then pre-dissolved in water at high concentrations prior to the addition of THF. This method was successful in keeping cysteine dissolved in a THF/water mixture. One of two things generally occurred upon the addition of butyl acrylate. Either the concentration of water was too high to allow the butyl acrylate to dissolve, or the concentration was too low to prevent the precipitation of cysteine upon the addition of the acrylate monomer. It was then determined that ethanol could be added in low concentrations in order to stabilize the THF/water/cysteine/butyl acrylate solution. The ethanol was effective in preventing the butyl acrylate from forming a second phase. The composition of the solvent system used was an 80/10/10 ratio, by weight, of THF/EtOH/$H_2O$. The monomer concentration was 15 wt. %.

The synthesis of poly(butyl acrylate) in the presence of cysteine was carried out using the solvent system described above. FIG. 2 depicts the desired amino acid functionality of the macromonomer. The monomer:cysteine:AIBN molar ratio used was 1000:30:1. The AIBN concentration must be kept low in order to minimize the number of chains initiated by AIBN. As stated previously, any chains initiated by the AIBN initiator and not the chain transfer agent will be, in effect, "dead" chains. That is, they will lack the desired amino acid functionality. The polymerization was run under nitrogen at 65° C. for 7 hours. A control polymerization was also run under the identical conditions in the absence of the cysteine chain transfer agent. The resulting polymers were isolated by rotary evaporation under vacuum at 40° C. Due to its low glass transition temperature, poly(butyl acrylate) is virtually impossible to isolate by precipitation in a nonsolvent. The reaction product of the control reaction was a clear, extremely tacky, viscous material with a yellowish haze. The cysteine modified product was very similar with the exception of the presence of a white precipitate dispersed within the poly(butyl acrylate). This precipitate could be separated from the polymer by dissolving the poly(butyl acrylate) in THF. The precipitate was insoluble in THF and could, therefore, be collected by filtration.

Figure 4:
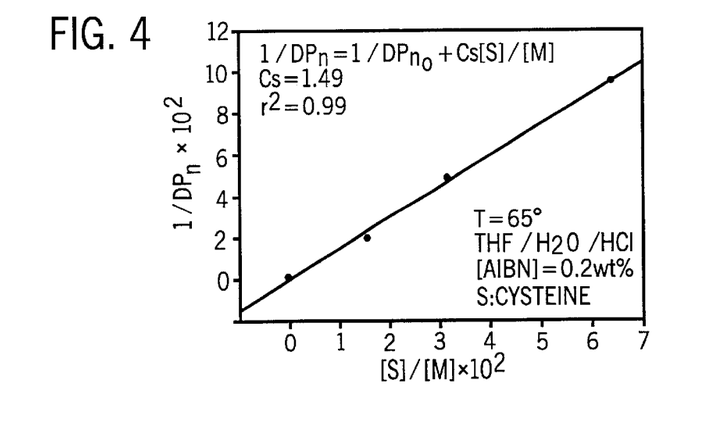
FIG. 4 is a graphic representation of a Mayo plot of a macromonomer of the invention.

The Mayo plot for butyl acrylate is set forth in FIG. 4.

As noted above, the side reaction depicted in FIG. 3 is reduced by carrying out the reaction at a reduced pH, i.e., below about 8.0 and above 0.

EXAMPLE 2

The polyamide graft copolymer synthesis was carried out in a solvent system originally developed by Higashi et al [*J. Polym. Sci.*, Polym. Chem. ed., Vol. 18, pages 1711, 1841, 2875 (1980)] for the solution polymerization of high molar mass polyamides. This polymerization of diacids and diamines was run in an NMP-pyridine so-solvent mixture, in the presence of triphenyl phosphite (TPP) and LiCl. The pyridine aids in the dissolution of the amino acid reactants. Triphenyl phosphite catalyzes the polymerization by reacting with the acids and amines to remove water from the condensation. LiCl facilitates the reaction of the triphenyl phosphite.

Figure 7:
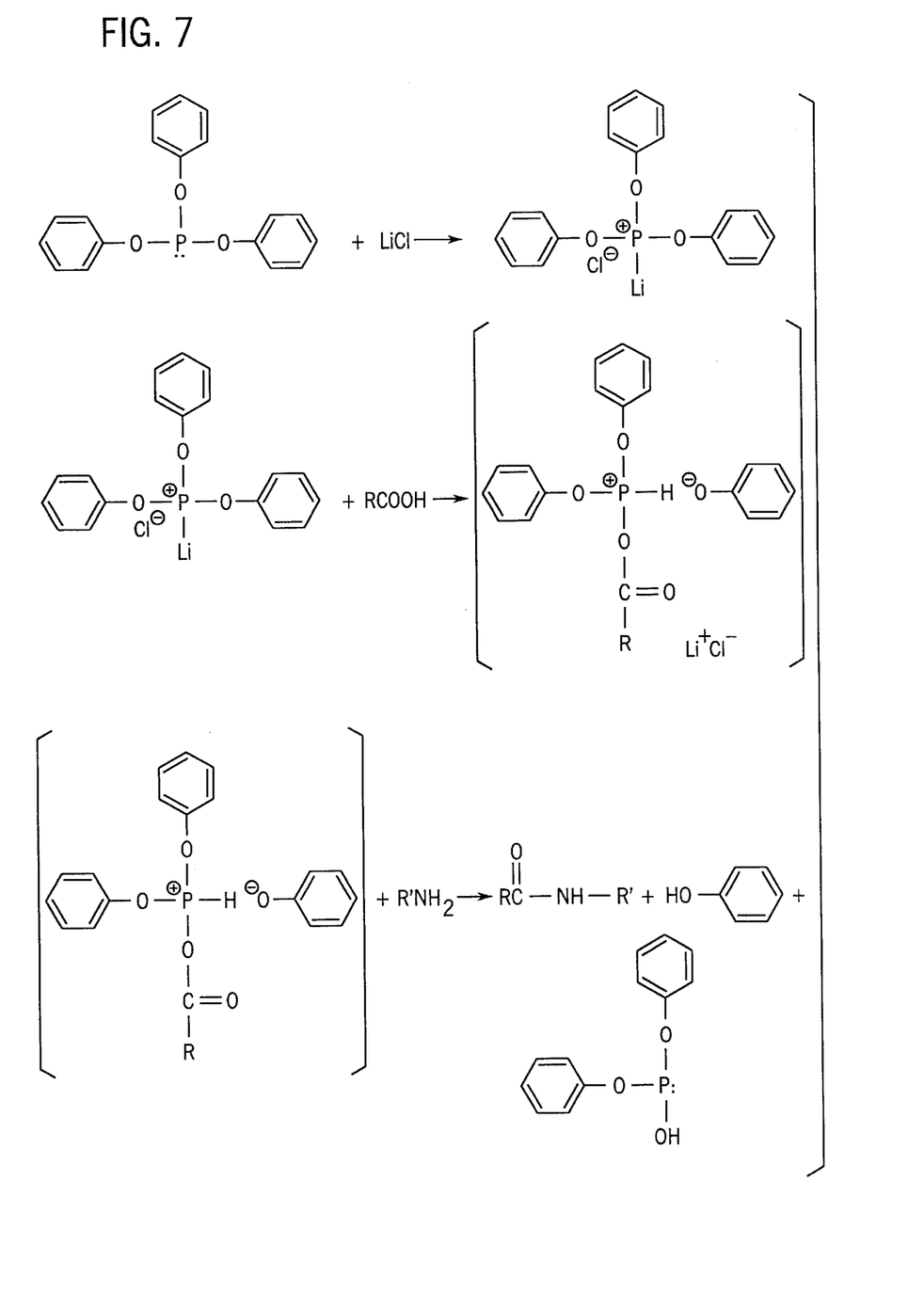

The condensation mechanism, as proposed by Higashi, is illustrated in FIGS. 5 and 7. Triphenyl phosphite reacts with LiCl to form a triphenyl phosphonium salt (FIG. 1, Step 1). The phosphonium salt then reacts with a carboxylic acid to form a diphenyl phosphonium cation and a phenolic anion (Step 2). An amine can then attack the carboxylic acid, producing an amide linkage, diphenyl phosphite and phenol (Step 3).

Synthesis

Figure 8:
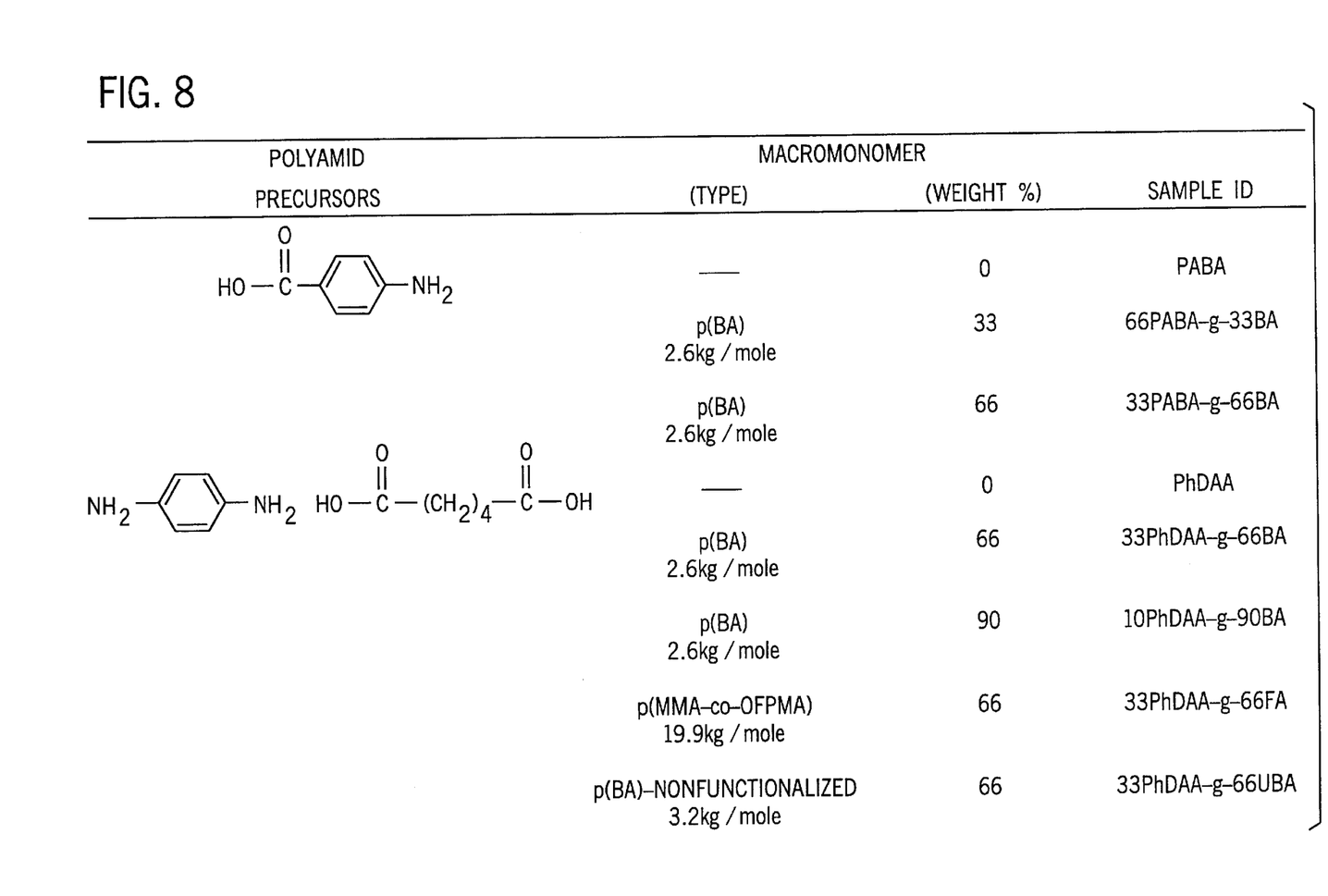
FIG. 8 is a tabular representation of the composition of a graft copolymer of the invention.

The synthesized graft copolymer compositions are shown in FIG. 8. Two different polyamide compositions, a wholly aromatic poly(aminobenzoic acid) (PABA) and an aromatic-aliphatic poly(phenylene diamine-co-adipic acid) (PhDAA), were homopolymerized and graft copolymerized in varying ratios with a 2.6 kg/mol amino acid-terminated poly(butyl acrylate) macromonomer. A control reaction was run in which a 3.2 kg/mol unfunctionalized poly(butyl acrylate) was substituted for the low molar mass poly(butyl acrylate) macromonomer. This unfunctionalized p(BA) was synthesized using a butyl mercaptan chain transfer agent, which should result in an unreactive butyl end group. PhDAA was also polymerized in the presence of a 19.9 kg/mol poly (MMA-co-OFPMA) macromonomer.

In a typical reaction, 1.37 g of 2.6 kg/mol p(BA) macromonomer (0.53 mmol), 0.241 g (2.24 mmol) p-phenylenediamine, 0.326 g (2.24 mmol) adipic acid, 1.55 TPP (5 mmol) and 0.09 g LiCl were dissolved in 30 ml of an 80/20 NMP/pyridine solution and heated at 100° C. for 4 hours. The resulting polymer, a tacky light brown solid, was obtained almost quantitatively by precipitation in an excess of 50/50 water/methanol non-solvent, filtered, washed with methanol and dried overnight under vacuum at 40° C. The molar concentration of amide precursors and catalysts were kept constant for all polymerizations.

The PABA-containing polyamides were insoluble in all common organic solvents. Those tried included THF, DMF, dichloroacetic acid and trifluoroacetic acid. The only solvent found for both the PABA homopolymer and copolymer was concentrated sulfuric acid. This is not surprising given the similarity of the aromatic structure in PABA to Kevlar® polyamides. PhDAA homopolymer and copolymers were soluble in both dichloroacetic acid and concentrated sulfuric acid.

All polyamide homopolymers and graft copolymers were Soxhlet extracted with HPLC grade THF, a solvent for any unreacted acrylate or methacrylate macromonomer.

The compositions of the purified graft copolymers were determined by elemental analysis (EA) from the nitrogen content. Composition was also determined from the $^1$H-NMR spectra of the graft copolymers using the integral ratios of aromatic protons from the polyamide to —$CH_3$ protons from the poly(acrylate).

The measured graft copolymer chemical compositions are tabulated in Table 3. The values calculated using NMR are in good agreement with those from EA. Poly(butyl acrylate) content varies from 19 to 54 wt. % for the graft copolymer series. As expected, the poly(butyl acrylate) content in the graft copolymer increases with increasing feed concentration.

Figure 6:
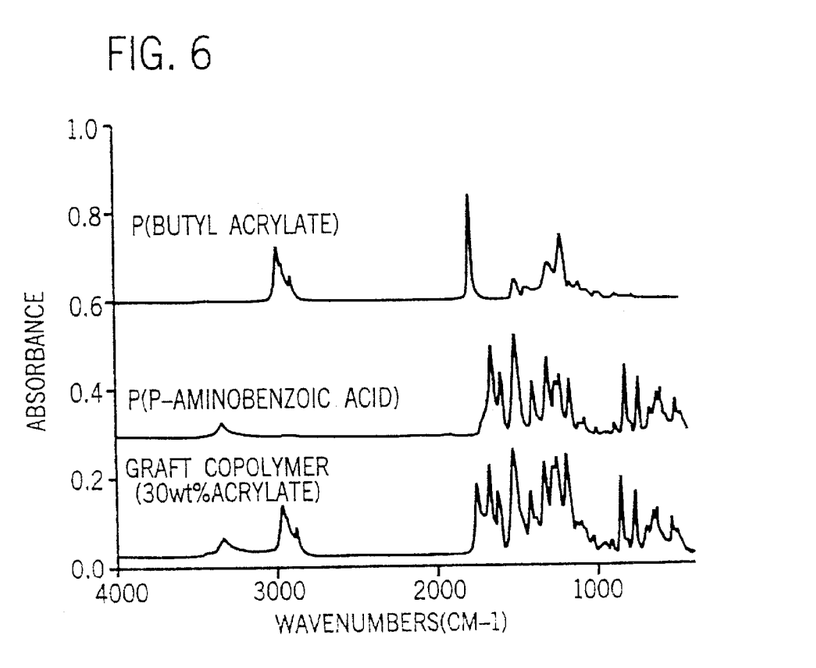
FIG. 6 is a graphic representation of a transmission FTIR of an acrylate-amide copolymer.

The ratio of poly(acrylate) concentration in the copolymer to the initial feed concentration was calculated and is also shown in Table 3. This ratio can be seen as a measure of % poly(acrylate) incorporation. Transmission FTIR spectra of the above-described system are shown in FIG. 6.

TABLE 3

Chemical Composition of Purified Graft Copolymers from Elemental Analysis and NMR

| Sample ID | Nitrogen (wt. %)$^{EA}$ | Graft Copolymer Composition$^{EA}$ (wt.%)* | | Graft Copolymer Composition$^{NMR}$ (wt.%) | | $\dfrac{[\text{Acrylate}]_{copolymer**}}{[\text{Acrylate}]_{feed}}$ |
|---|---|---|---|---|---|---|
| | | Amide | Acrylate | Amide | Acrylate | |
| 66PABA-g-33Bax | 9.47 | 81 | 19 | 79 | 21 | 0.61 |
| 33PABA-g-66Bax | 6.35 | 54 | 46 | 60 | 40 | 0.65 |
| 33PhDAA-g-66Bax | 7.03 | 55 | 45 | 54 | 46 | 0.69 |
| 10PhDAA-g-90Bax | 6.42 | 46 | 54 | 47 | 53 | 0.60 |
| 33PhDAA-g-66Fax | 9.64 | 75 | 25 | 75 | 25 | 0.38 |

*calculated using wt. % N for PABA = 11.76, PhDAA = 12.84
**based upon average of EA and NMR acrylate wt. %

We claim:

1. A method of preparing a graft copolymer of a polyamide comprising reacting under condensation polymerization conditions a mixture comprising:

(a) for chain transfer, an amino acid functionalized macromonomer composition having a degree of polymerization of from about 5 to about 20,000, and wherein at least 10 mol percent of the macromonomer has the end group:

wherein:

$R_1$ and $R_2$ are H or $CH_3$; and

Z is alkylene or arylene; and and (b) a monomeric mixture which forms a polyamide by condensation polymerization wherein said monomeric mixture comprises a component selected from the group consisting of:

(i) a mixture of a dicarboxylic acid having 1 to 10 carbon atoms and terminal carboxyl groups and a diamine having 1 to 12 carbon atoms and primary amino groups, salts, esters, amides and acid halides of said dicarboxylic acid and salts of said diamine;

(ii) amino monocarboxylic acids having 1 to 10 carbon atoms and primary amino groups and terminal carboxyl groups, and (iii) lactams, esters and amides of said amino carboxylic acids.

2. A method of claim 1 wherein said monomeric mixture comprises p-aminobenzoic acid.

3. The method, according to claim 1, wherein said macromomomer is prepared by reacting (a) for chain transfer, an amino acid having the formula:

wherein:

$R_1$ and $R_2$ are H or $CH_3$; and

Z is alkylene or arylene; and (b) at least one polymerizable ethylenically unsaturated monomer, such that, as a result of reacting said mixture, at least 10 mol percent of the macromonomer composition product has the end group:

4. The method, according to claim 3 wherein said amino acid is cysteine.

5. The method, according to claim 3 wherein said ethylenically unsaturated monomer is acrylate.

6. The method, according to claim 3 wherein said ethylenically unsaturated monomer is butyl acrylate, methyl acrylate, methyl methacrylate, tert-butyl-acrylate, cyclohexyl acrylate, cyclohexyl methacrylate, butyl methacrylate, phenyl acrylate or phenyl methacrylate.

7. The method, according to claim 3, wherein polymerized monomer is an acrylate.

8. The method, according to claim 7, wherein said acrylate is butyl acrylate.

* * * * *